Jan. 10, 1956 D. L. CURTIS 2,730,632

DIODE GATING CIRCUIT

Filed Feb. 1, 1952 2 Sheets-Sheet 1

INVENTOR.
DANIEL L. CURTIS,
BY Nicholas T Volk
ATTORNEY.

Jan. 10, 1956 D. L. CURTIS 2,730,632

DIODE GATING CIRCUIT

Filed Feb. 1, 1952 2 Sheets-Sheet 2

INVENTOR.
DANIEL L. CURTIS,
BY Nicholas T Volk
ATTORNEY.

United States Patent Office 2,730,632

Patented Jan. 10, 1956

2,730,632

DIODE GATING CIRCUIT

Daniel L. Curtis, Venice, Calif., assignor, by mesne assignments, to Hughes Aircraft Company, a corporation of Delaware Application February 1, 1952, Serial No. 269,565

8 Claims. (Cl. 307—88.5)

This invention relates to diode gating circuits and more particularly to diode gating circuits whose gating functions are not appreciably affected by substantial decreases in the back resistance of their principal diode elements.

Various types of gating circuits employing diodes, and more particularly crystal diodes, as their principal elements have been utilized in the past. However, all of such diode gating circuits have, to great extent, been dependent for successful operation upon the continued and uninterrupted high back resistance of their diode element. Upon a sizable decrease of the back resistance of the diode, owing to age, heat, defective materials or workmanship, etc., such gating circuits may either greatly reduce the magnitude of any passed signals or, worse still, pass input signals which should have been blocked. Some electronic devices, such as digital computers, which employ hundreds of such diode gating circuits, may be rendered inoperative by the loss of effective operation of only one of their gating circuits owing to the decrease of back resistance of the circuit's diode element. Thus, the importance of a diode gating circuit, whose operation is not appreciably affected by changes in the back resistance of its diode, becomes at once apparent.

Two embodiments of diode gating circuits, according to the present invention, are set forth and described. One embodiment is of a two terminal "and" gating circuit in which the control signal is applied across three serially-connected resistors, all of substantially the same value. The diode is connected in parallel across one of the end resistors and the input pulses are applied across the paralleled resistor and diode. When the control signal is applied, the diode is back-biased and all input pulses appearing during that interval produce a corresponding potential drop across the paralleled resistor and diode. This potential drop is then differentiated by a differentiator circuit and appears as a passed output pulse. On the other hand, all input pulses occurring when the control signal is not applied are shorted directly to ground through the forward resistance of the diode and, hence, do not appear as output pulses. By making the values of each of the serially-connected resistors relatively small in comparison with the back resistance of the diode, a considerable reduction of the diode back resistance may be tolerated without appreciably affecting the operation of the gating circuit.

The second embodiment of the present invention is a three-terminal gating circuit which is selectively operable as either an "or" or an "and" gating circuit. In this circuit, two separate control signals are applied through appropriate resistors to one end of a parallel combination of a diode and a resistor, the other end of the combination being connectable either to ground or to a source of potential whose voltage is equal to the voltage which would normally appear across the parallel combination owing to the appearance of only one of the control signals. With the combination connected to ground, the gating circuit functions as an "or" gating circuit and all input pulses applied across the combination are passed to an output terminal through a differentiating circuit if either or both of the control signals are applied. However, with the combination connected to the source of potential, the gating circuit functions as an "and" gating circuit and the only input pulses which are passed are those appearing when both control signals are applied. In the gating circuit of this embodiment, considerable reduction in the diode back resistance may also be tolerated without appreciably affecting the gating operations.

With the gating circuits, according to the present invention, accurate voltage regulation of the control signals is not required to maintain proper operation of the gate. Therefore, unclamped flip-flop output signals may be used, as is herein illustrated, for the control signals of the gating circuits.

It is, therefore, an object of the present invention to provide diode gating circuits whose gating functions are not appreciably affected by substantial reductions of the back resistance of their principal diode elements.

Another object of the present invention is to provide a two terminal diode "and" gating circuit whose gating function is not appreciably affected by a substantial decrease in the diode's back resistance.

A further object of the present invention is to provide an "and" gating circuit whose gating functions are relatively unaffected by normal variations of the potential of the control signals.

A still further object of the present invention is to provide a three-terminal diode gating circuit which is selectively operable as either an "and" or an "or" gating circuit and whose gating function is not appreciably affected by a substantial reduction of the diode's back resistance.

A still further object of the present invention is to provide a three-terminal gating circuit, for use with two control signals, which is selectively operable as either an "and" or an "or" gating circuit and whose gating function is relatively unaffected by normal variations in the potential magnitude of the two control signals.

The novel features which are believed to be characteristic of the invention, both as to its organization and method of operation, together with further objects and advantages thereof, will be better understood from the following description considered in connection with the accompanying drawings, in which two embodiments of the invention are illustrated by way of examples. It is to be expressly understood, however, that the drawings are for the purpose of illustration and description only, and are not intended as a definition of the limits of the invention.

Figure 1:
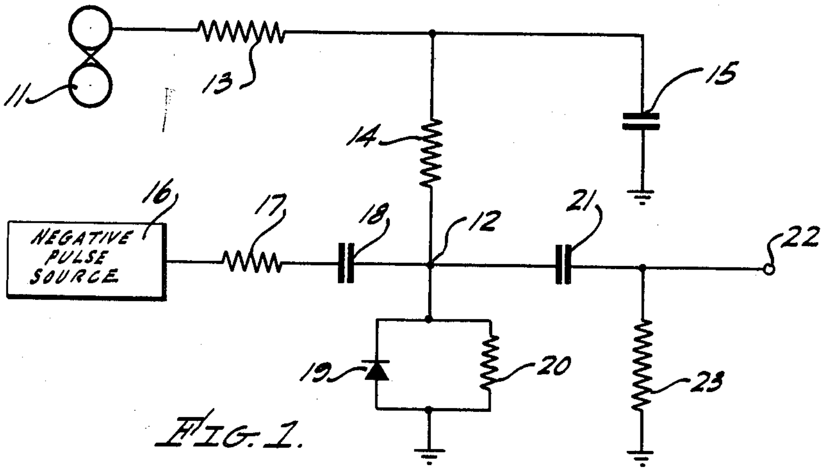
Fig. 1 is a circuit diagram of one embodiment of an electronic gating circuit according to the present invention.

Referring now to Fig. 1, there is illustrated one embodiment of an "and" gating circuit according to the present invention. A source of alternate high and low voltage level control signals, such as a flip-flop 11, has one output terminal coupled to a junction point 12 through a pair of serially connected resistors 13 and 14. The common junction of resistors 13 and 14 is connected to one plate of a capacitor 15, the other plate of capacitor 15 being connected to ground. Junction point 12 is coupled to the output terminal of a low impedance pulse source 16 through a serially-connected resistor 17 and a capacitor 18, and to an output terminal 22 of the gating circuit through a capacitor 21. The common junction of capacitor 21 and output terminal 22 is coupled to ground through a resistor 23, the values of capacitor 21 and resistor 23 being such as to form a differentiating circuit. The cathode of a rectifying device, such as a crystal diode 19, is connected to junction point 12, the anode of diode 19 being connected to ground. A resistor 20 is connected across diode 19 between junction point 12 and ground.

In operation, flip-flop 11 produces, on its output terminal, either a high voltage level control signal of approximately 90 volts, or a low voltage level control signal of approximately 0 volts or ground potential, by way of example. When flip-flop 11 is producing the high voltage level signal, current flows from flip-flop 11 to ground through resistors 13, 14 and 20. The resistance values of these three resistors are approximately equal, and hence, a potential drop of approximately 30 volts will appear across resistor 20.

If, during the period that the high voltage level signal appears at the output terminal of flip-flop 11, a negative pulse of at least a 30-volt magnitude is produced by pulse source 16, the negative pulse will lower the potential of point 12 from 30 volts to ground potential. Any potential of the pulse in excess of 30 volts will not lower the potential of point 12 below ground potential but, instead, will be shorted to ground through the forward resistance of diode 19. Thus, the negative pulse reduces the potential at point 12 from 30 volts to ground potential, and upon the termination of the pulse the potential at point 12 rises back to 30 volts. If the negative pulse is of less than 30-volt magnitude, the potential of point 12 will be lowered from its 30-volt potential an amount equal to the magnitude of the pulse. This change of potential of junction point 12 will be differentiated by resistor 23 and capacitor 21 and appear as an output pulse on output terminal 22, capacitor 21 also serving to decouple the direct-current potential appearing at point 12 from output terminal 22.

On the other hand, if flip-flop 11 is producing its low voltage level control signal of 0 volts, then point 12 is maintained at 0 volts, and any negative pulse occurring during this period will be shunted directly to ground through the forward resistance of diode 19. Accordingly, the potential of point 12 is not changed and no corresponding output pulse is produced on output terminal 22.

It is thus seen that when flip-flop 11 produces its high voltage level control signal, the gating circuit is opened and any negative pulses produced during that interval will appear as output pulses on output terminal 22. On the other hand, when flip-flop 11 produces its low voltage level control signal, the gating circuit is closed and all pulses produced during that interval will be blocked by the circuit from terminal 22.

Capacitor 15 performs two major functions. Firstly, it decouples the output pulses produced by source 16 from the output terminal of flip-flop 11 to prevent these pulses from triggering flip-flop 11 through its plate circuit. Secondly, capacitor 15 shunts a portion of the flip-flop energy, during the time of change from one output voltage level to the other output voltage level, so as to delay either the rise time or fall time of the potential at junction 12. This is required in order to prevent the change of state of flip-flop 11 from being differentiated by resistor 23 and capacitor 21 and appearing as a spurious output pulse on terminal 22.

The low output impedance of the pulse source 16 also shunts a considerable portion of the output energy of flip-flop 11 to ground upon the change of the control signal of flip-flop 11 from one voltage level to the other, thereby also delaying the rise or fall time of the potential at junction 12. Resistor 17 acts to limit the current of the output pulses of source 16 when flip-flop 11 is producing its low voltage level, since, without this limiting resistor, the output pulses would be shunted directly to ground through the extremely low forward resistance of diode 19.

Figure 2:
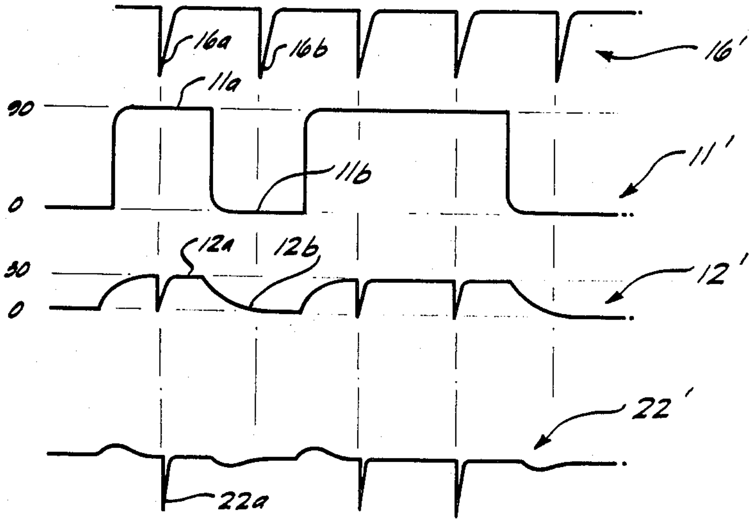
Fig. 2 is a composite diagram of the waveforms of signals appearing at various points in the circuit of Fig. 1.

A composite diagram of the waveforms of signals appearing at various points in the circuit of Fig. 1 is set forth in Fig. 2 to illustrate in greater detail the operation of this embodiment of the gating circuit according to the present invention. The signal, generally designated 16' in Fig. 2, is the output signal of pulse source 16 and comprises a series of periodic negative pulses. The signal, generally designated 11' in Fig. 2, is the signal appearing on the output terminal of flip-flop 11 and comprises alternate high and low voltage levels of 90 and 0 volts, respectively. The signal, generally designated 12' in Fig. 2, is the signal appearing at junction point 12. Thus, when the potential of signal 11' rises from 0 volts to the first high voltage level **11*a* of 90 volts, the potential of point 12 rises relatively slowly to the 30 volt level 12*a*, owing to the shunting action of capacitor 15 and the low output impedance of pulse source 16**.

Pulse **16*a* of signal 16', occurring during the interval of level 11*a*, lowers the potential of point 12 to 0 volts, the potential of point 12 then instantly returning to its normal 30 volt level at the end of pulse 16*a*. The signal, generally designated 22' in Fig. 2, appearing on output terminal 22, is the differentiated result of signal 12'. The relatively slow rise to level 12*a* of signal 12' produces a slight positive potential of signal 22', whereas pulse 16*a* produces a sharp negative pulse 22*a* of signal 22'**.

When flip-flop 11 changes its conduction state and produces low voltage level **11*b* of signal 11', level 12*a* of signal 12' slowly falls to the low voltage level 12*b* of 0 volts potential, the slow fall again being due to the shunting effects of capacitor 15 and the low output impedance of source 16. This slow potential fall between levels 12*a* and 12*b* of signal 12' is differentiated by resistor 23 and capacitor 21 and appears as a slight negative potential of signal 22'**.

The second input pulse **16*b* of signal 16', occurring during level 11*b* of signal 11', will be shorted to ground through the forward resistance of diode 19. Owing to the negligible forward resistance of diode 19 compared to the resistance of resistor 20, pulse 16*b* will not appear in level 12*b* of signal 12' and also, therefore, will not appear in output signal 22'. The remaining portions of the signals illustrated in Fig. 2 may be readily understood from the description set forth above for the first two voltage levels of signal 11'**.

Figure 3:
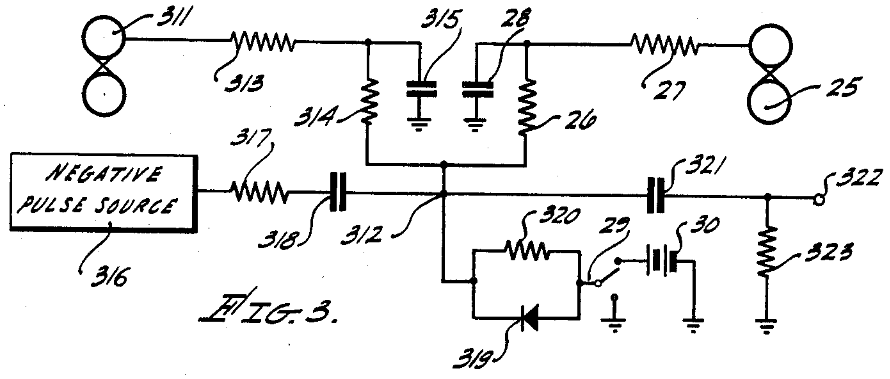
Fig. 3 is a circuit diagram of another embodiment of an electronic gating circuit according to the present invention.

Referring now to Fig. 3, there is illustrated another gating circuit according to the present invention which is selectively operable as either an "and" or an "or" gating circuit. The gating circuit, as illustrated, is similar to the gating circuit of Fig. 1, the identical components herein being numbered as previously but preceded by the digit 3.

The gating circuit of Fig. 3 further includes a flip-flop 25, having one terminal connected to junction point 312 through a pair of serially connected resistors 26 and 27. The common junction of resistors 26 and 27 is connected to one plate of a capacitor 28, the other plate of capacitor 28 being grounded. Resistors 26 and 27 correspond in value to resistors 313 and 314, respectively, and flip-flop 25 is similar to flip-flop 311. The anode of diode 319, and the end of resistor 320 connected thereto is, in this embodiment, connected to the movable switch arm of a switch 29. One fixed switch point of switch 29 is connected to ground while the other fixed switch point is connected to the positive terminal of a source of potential, such as a battery 30, the negative terminal of battery 30 being connected to ground.

Figure 4:
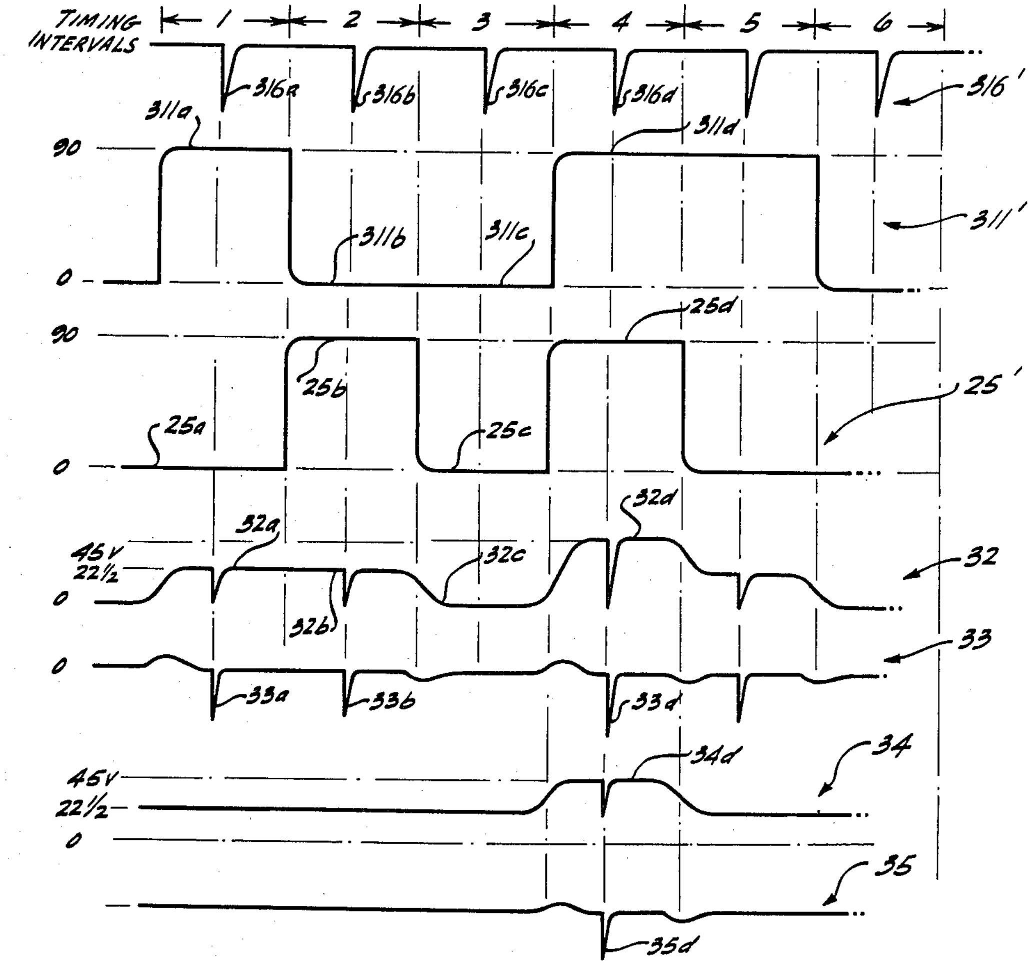
Fig. 4 is a composite diagram of the waveforms of signals appearing at various points in the circuit of Fig. 3.

In operation, when the switch arm of switch 29 contacts the grounded switch point, the gating circuit functions as an "or" gate, and the pulses produced by source 316 during this contact interval will be passed if either or both of flip-flops 311 and 25 are producing their high voltage level control signals. This may be most readily understood by reference to the composite diagram of signals appearing at various points on the circuit of Fig. 3, as illustrated in Fig. 4. The output signal, generally designated 316' in Fig. 4, of source 316, is identical to signal 16' of Fig. 2 and is repeated here for the sake of clarity. The series of negative pulses of signal 316' occur at points intermediate a corresponding series of designated timing intervals.

In Fig. 4, the signal, generally designated 311', is the output signal of flip-flop 311 and the signal, generally designated 25', is the output signal of flip-flop 25. Each of signals 311' and 25' contains alternate high and low voltage levels occurring during the series of timing intervals. The signal, generally designated 32, is the signal appearing on junction point 312 during the operation of the gating circuit as an "or" circuit, and the signal, generally designated 33, is the signal appearing on output terminal 322 as derived from the differentiation of signal 32.

During the first timing interval, signal 311' is assumed to be at its high voltage level **311*a* of signal 311', while signal 25' is assumed to be at its low voltage level 25*a*. Point 312 is maintained, as indicated by level 32*a* of signal 32, at 22½ volts, which value may be calculated by using the circuit parameter relationships previously set forth. Pulse 316*a* of signal 316', occurring during this first timing interval, is, therefore, passed by the gating circuit and appears as output pulse 33*a* of signal 33. During the next or second timing interval, the conduction states of flip-flops 311 and 25 are reversed, and point 312 is still maintained at 22½ volts, as indicated by level 32*b* of signal 32'. The second pulse 316*b* of signal 316', appearing during this second timing interval, is likewise passed and appears as output pulse 33*b* of signal 33**.

During the third timing interval, signals 311' and 25' are at low voltage levels **311*c* and 25*c*, respectively, with the result that point 312 is maintained at zero potential, as indicated by level 32*c* of signal 32. Pulse 316*c* of signal 316', produced during this third timing interval, is shunted directly to ground by diode 319 and thus does not appear at terminal 322. During the fourth timing interval, both of signals 311' and 25' are at high voltage levels 311*d* and 25*d*, respectively, with the result that point 312 is maintained at 45 volts potential level 32*d*, as may be calculated from the stated circuit parameters. Accordingly, pulse 316*d* of signal 316', occurring during this interval, is passed by the circuit and appears as output pulse 33*d* of signal 33. Pulse 33*d* will, if the pulses of signal 316' are of greater than 22½ volts magnitude, be greater than either of the prior output pulses 33*a* or 33*b* owing to the higher potential of point 312** at the time of its appearance. The operation of the gating circuit for the fifth timing interval may be readily understood from the description set forth for the first four timing intervals.

It is thus seen that, for the grounded switch position, whenever either or both flip-flops produce their high voltage level control signals, the gating circuit passes any input pulses appearing during that interval and the circuit functions as an "or" gating circuit. However, the circuit operates as an "and" gating circuit when the movable switch arm of switch 29 makes contact with the switch point connected to battery 30, which produces a positive potential of 22½ volts. The potential of point 312 is, for this switch position, maintained at a normal 22½ volt potential, the same potential placed thereon in the operation of the gating circuit as an "or" gating circuit when either but not both of signals 311' and 25' was at its high voltage level. The signal, generally designated 34 in Fig. 4, is the signal at point 312 during this switch position, while the signal, generally designated 35 in Fig. 4, appearing on output terminal 322, is the differentiated result of signal 34.

Any input pulses appearing when point 312 is at the 22½ volt potential of battery 30, will be shorted through the forward resistance of diode 319 and battery 30 to ground and, hence, will not occur as output pulses on terminal 322. However, when both signals 311' and 25' are at their high voltage levels, point 312 is maintained at 45 volts, or 22½ volts higher than battery 30, and any input pulses occurring during such an interval will be passed by the circuit.

As will be observed from Fig. 4, the only timing interval during which signal 34 rises to a 45-volt level **34*d* is the fourth one. Pulse 316*d* lowers the potential of point 312 to the 22½ volt potential of battery 30, and the resulting potential drop of point 312 is differentiated by resistor 323 and capacitor 321 to produce on output terminal 322 an output pulse 35*d* of signal 35**.

The rise and fall of the voltage levels appearing on point 312, owing to the change of output voltage levels of either flip-flop 311 or flip-flop 25, are delayed in the gating circuit of Fig. 3, by the shunting action of capacitors 315 and 28, and the low impedance of source 316, in the same manner as that described in connection with the gating circuit of Fig. 1. These delayed rises and falls, after differentiation, appear in output signals 33 and 35 as positive and negative pulses, respectively, the pulses being relatively insignificant in magnitude as compared to the magnitude of the output pulses.

One of the principal advantages possessed by the diode gating circuits according to the present invention is that their gating operations are not appreciably effected by changes in the back resistance of their diode element. Thus, in Fig. 1, whenever flip-flop 11 produces its high voltage level, diode 19 is back-biased, and the resistance to ground from point 12 is the parallel combination of resistor 20 and the back resistance of diode 19. If, by way of example, the resistance of resistor 20 is 50,000 ohms, then the total resistance to ground will be only slightly lower than 50,000 ohms since the normal back resistance of diode 19 will be of the order of 500,000 ohms. If now, owing to heat, age, etc., the back resistance of diode 19 should be appreciably reduced, the resistance reduction of the parallel combination will be slight owing to the relatively low initial resistance of resistor 20. Such a resistance reduction will reduce the voltage appearing at point 12 a relatively small amount by altering the serial voltage division between resistors 13 and 14 and the parallel combination of resistor 20 and diode 19. The reduction of the voltage of point 12, in turn, reduces the magnitude of the output pulses passed by the circuit, since point 12, as noted previously, cannot be brought lower than ground potential. As will be apparent, the gating circuit according to Fig. 3 may likewise tolerate considerable variations in the back resistance of diode 319 without having its gating functions appreciably affected.

Another advantage possessed by the gating circuits according to the present invention is that satisfactory gating operations may be obtained without clamping the flip-flop output voltages. This is due to the fact that only a third of any variation in the output voltages of the flip-flop will appear in the circuit of Fig. 1, for example, as a variation of the voltage on point 12 with the circuit parameters cited. Since this variation of the voltage of point 12, in turn, will vary the magnitude of the passed output pulses in the manner set forth previously, the effect on the magnitude of the output pulses by the flip-flop output voltage variation is effectively reduced to one-third of its original amount. Thus, considerable variation thereof may be tolerated without appreciably affecting the magnitude of the passed output pulses. As will here also be apparent, the circuit of Fig. 3 may tolerate variations in the magnitudes of the applied control signals without having its gating functions appreciably affected.

As will be apparent to those skilled in the art, the gating circuits illustrated may take other forms without deviating from the spirit and scope of the present invention. Thus, positive input pulses may be utilized with the gating circuits, if the two output voltage levels of the flip-flops are zero and a negative voltage, respectively, and the direction of the diode connection is reversed. In such a case, in the circuit of Fig. 1 for example, the positive pulses would be passed during the time the flip-flop produces its negative output voltage level and would be blocked during the time the zero output voltage level is produced.

What is claimed as new is:

1. An electronic gating circuit for passing input pulses upon occurrence of an electrical control signal, said circuit comprising: a first resistor; a second resistor; means conductively coupling said first and second resistors in series; a diode conductively coupled across said second resistor; means for applying the control signal across the serially coupled first and second resistors to back-bias said diode; means for applying the input pulses across the second resistor; and output means conductively coupled across said second resistor, said output means being responsive to back-biasing of said diode for producing an output pulse corresponding to each input pulse.

2. An "or" gating circuit for passing an input pulse upon occurrence of both or either of first and second control signals, said circuit comprising: a resistor element; rectifying means conductively coupled across said element; means for applying said first and second control signals across said element, said rectifying means being back-biased by the appearance of either or both of the first or second control signals; and means for applying the input pulses across said element to produce corresponding output pulses across said element when said rectifying means is back-biased.

3. An electronic gating circuit, responsive to first and second control signals, for passing or blocking input pulses, said circuit comprising: a source of potential; first and second resistive paths, said paths including a common section, said common section having a resistor element and selectively operable means for conductively coupling said source of potential in series with said element; means for applying the first and second signals across said first and second resistive paths, respectively; a diode conductively coupled across said element, said diode being back-biased by the simultaneous appearance of the first and second control signals when said selectively operable means is actuated and back biased by the appearance of either or both of the first and second control signals when said selectively operable means is unactuated; and means for applying the input pulses across said common section, the input pulses appearing when said diode is back-biased producing corresponding pulses across said resistor element.

4. The gating circuit defined in claim 3 including, in addition, an output circuit conductively coupled across said common section for separating said corresponding pulses from the first and second control signals and producing output pulses from said corresponding pulses.

5. An electronic gating circuit for selectively passing and blocking input pulses, said circuit being responsive to first and second control signals, said circuit comprising: first and second impedance networks, each of said networks having first and second ends; a resistor element; a diode conductively coupled in parallel with said element; means conductively coupling the second ends of said first and second impedance networks to one end of said parallel-coupled element and diode; a source of potential; switching means operable in a first position for connecting the other end of said parallel-coupled element and diode to said source of potential and operable in a second position for connecting said other end to ground; means for applying said first and second control signals to the first ends of said first and second impedance networks, respectively, to back-bias said diode, said diode being back-biased by the simultaneous appearance of the first and second control signals when said switching means is in said first position or by the appearance of either or both of said first and second control signals when said switching means is in said second position; a source of input pulses; means for applying the input pulses to said one end of said parallel-coupled element and diode, said input pulses appearing as corresponding pulses across said element whenever said diode is back-biased; and output means, conductively coupled to said one end of said parallel-coupled element and diode, for producing output pulses from said corresponding pulses, said output pulses being electrically separated from the control signals.

6. The gating circuit defined in claim 5, wherein said output means comprises a differentiating circuit.

7. The gating circuit defined in claim 6, wherein each of said first and second impedance networks includes a pair of serially connected resistors and a capacitor conductively coupled between ground and the common junction of said serially connected resistors.

8. The gating circuit defined in claim 7, wherein the resistance values of each of the serially connected resistors in said first and second impedance networks and said resistor element are substantially equal, said values being relatively small in comparison to the normal back resistance of said diode.

References Cited in the file of this patent

UNITED STATES PATENTS

| | | |
|---|---|---|
| 2,535,303 | Lewis | Dec. 26, 1950 |
| 2,557,729 | Eckert, Jr. | June 19, 1951 |
| 2,562,305 | Ellsworth et al. | July 31, 1951 |
| 2,576,026 | Meacham | Nov. 20, 1951 |
| 2,589,767 | Bess | Mar. 18, 1952 |